(No Model.) 2 Sheets—Sheet 1.

E. QUEROL Y DELGADO.
DEVICE FOR TRIMMING THE ENDS OF TUBES.

No. 356,957. Patented Feb. 1, 1887.

WITNESSES:
John H. Deemer
C. Sedgwick

INVENTOR:
Emilio Querol y Delgado
BY Munn & Co.
ATTORNEYS.

(No Model.) 2 Sheets—Sheet 2.

E. QUEROL Y DELGADO.
DEVICE FOR TRIMMING THE ENDS OF TUBES.

No. 356,957. Patented Feb. 1, 1887.

WITNESSES:
John H. Daemer
C. Sedgwick

INVENTOR:
Emilio Querol y Delgado
BY Munn & Co
ATTORNEYS.

UNITED STATES PATENT OFFICE.

EMILIO QUEROL Y DELGADO, OF BROOKLYN, NEW YORK.

DEVICE FOR TRIMMING THE ENDS OF TUBES.

SPECIFICATION forming part of Letters Patent No. 356,957, dated February 1, 1887.

Application filed June 26, 1886. Serial No. 206,304. (No model.)

*To all whom it may concern:*

Be it known that I, EMILIO QUEROL Y DELGADO, of Brooklyn, in the county of Kings and State of New York, have invented a new and Improved Tube-Finishing Machine, of which the following is a full, clear, and exact description.

This invention has for its object the finishing of the ends of tubes or pipes, including service-pipes used for conveying gas or water, after the same have been cut to length. Ordinarily in cutting small iron and other metal pipes to length the cutter, which is operated from the exterior, not only makes a bad or imperfect finish at the cut end of the pipe, but leaves a burr which extends to the inside and often materially interferes with the free flow of fluid through the pipe.

My invention consists in a novel tool that with its holder, which forms a portion of the invention, constitutes a hand machine or apparatus, substantially as hereinafter described, and pointed out in the claims, for removing the burr or burrs on the cut end of the pipe and for finishing said end.

Reference is to be had to the accompanying drawings, forming a part of this specification, in which similar letters of reference indicate corresponding parts in all the figures.

Figure 1:
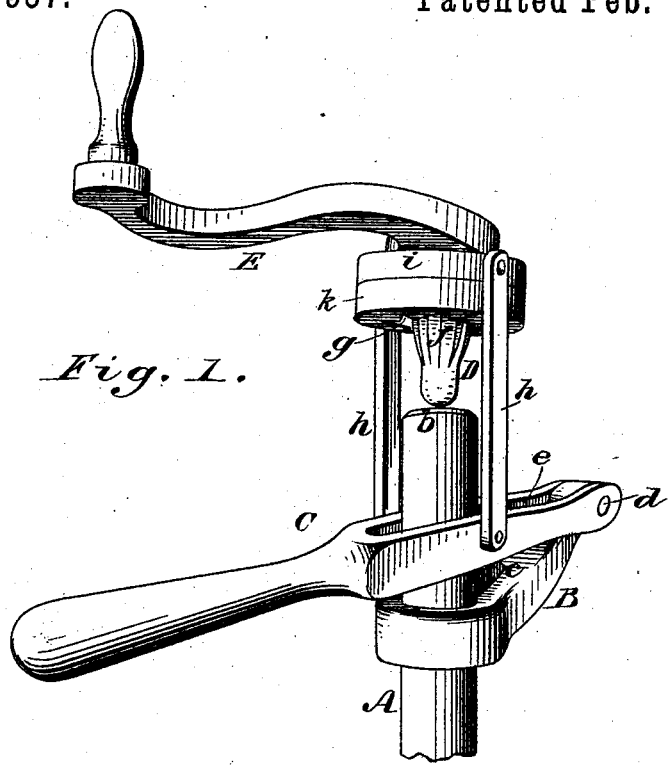
Figure 2:
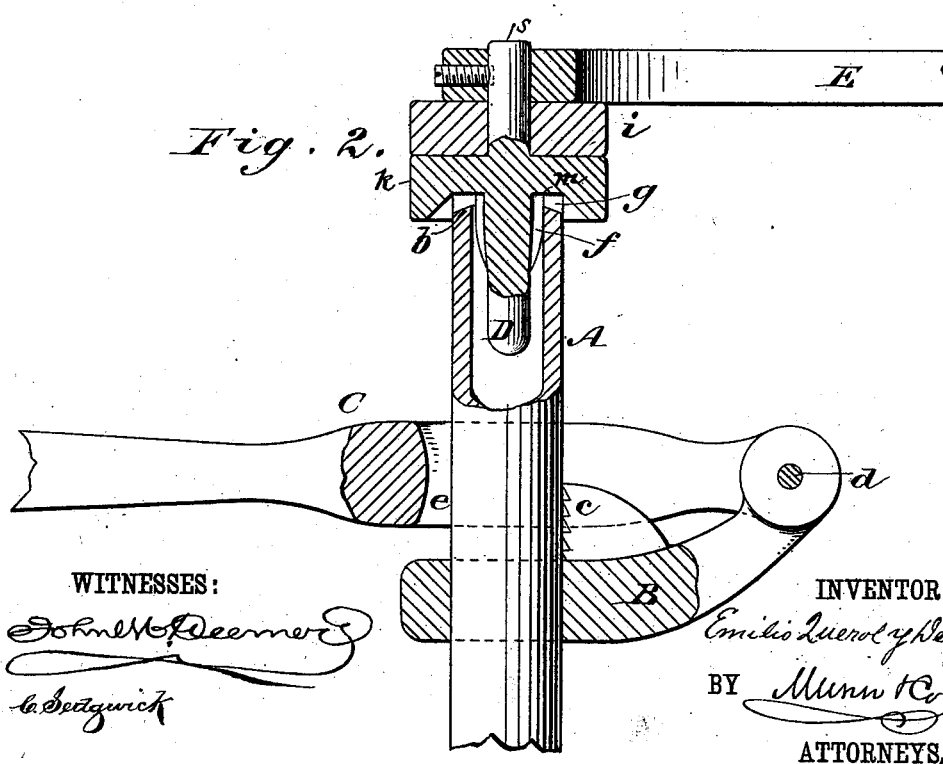
Figure 3:
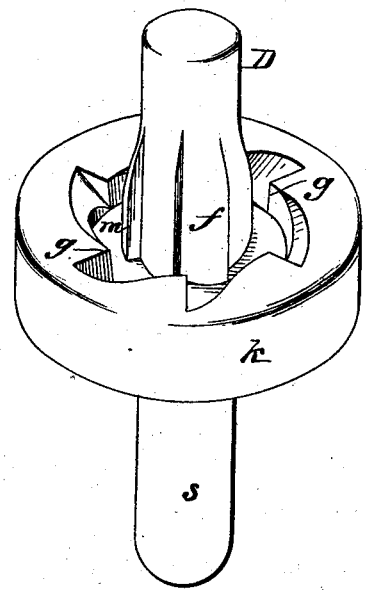
Figure 4:
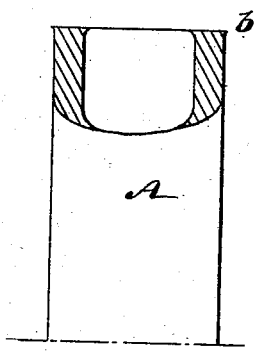
Figure 5:
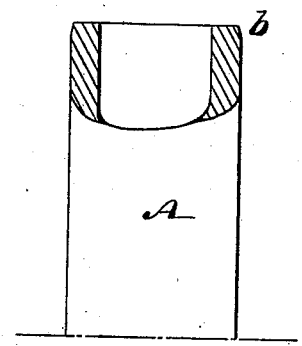

Figure 1 represents a view in perspective of a tool and holder therefor embodying my invention and as applied to the cut end of a piece of tube or pipe, and Fig. 2 is a partly broken and sectional longitudinal view of the same. Fig. 3 is a view in perspective of the tool proper in an inverted position, upon a larger scale. Fig. 4 is a partly sectional and broken view of a piece of pipe before the same has been dressed by my improved tool, and Fig. 5 is a similar view of the same piece of pipe after it has been finished at its end by the tool.

A indicates a piece of metal tube or pipe, and $b$ its cut end.

D is the tool for removing the burr or burrs from the end of the pipe left in severing the pipe. This tool is formed with a head, $k$, having an annular recess, $m$, in its under or inner face, adapted to receive within it the cut end of the pipe after it has been dressed, and said head $k$ is further provided around the outer margin of said annular recess with a series of cutters, $g$, formed by angular recesses, leaving inner cutting-edges in the inner face of the head and adapted to remove any burr or roughness on the outer sides of the pipe at its end. The inner margin of the annular recess $m$ is formed by a stem projecting from the inner face of the recessed head, adapted to enter within the end portion of the pipe, and constructed with cutting-edges near its base, forming a reaming cutter or body, $f$, which, as the tool is rotated—as, for instance, by an outer stem extension or shank, $s$, or by its head $k$—removes the burr on the inner end of the pipe left by severing the latter.

In some cases, especially where the pipe to be operated upon is a soft metal one, the tool D may be rotated by the fingers or otherwise, and without the use of a special holder; but it is preferred, in a general way, to combine it with a holder, substantially as shown in the accompanying drawings, and which is constructed as follows:

B is an eye or sleeve-like jaw or arm adapted to slip over the cut-end portion of the pipe, and having an attached projecting clamp, $c$, which, when pressure is applied to the outer end of the arm B, binds or bears upon the side of the pipe to hold the apparatus thereon. Pivoted, as at $d$, to the outer end of this jaw or arm B is a hand-lever, C, slotted, as at $e$, to slip over the pipe and to pass to the opposite side thereof to that on which the fulcrum or pivot $d$ of the lever is arranged. This hand-lever C not only serves by pressing inward or bearing down on it to exert a tilting action upon the jaw or arm B to make the apparatus hold on to the pipe, but it also serves by its downward or inward motion to give the necessary pressure on and feed to the tool D, the outer stem-extension, $s$, of which passes within or through an outer collar or head, $i$, that is connected by links $h\ h$ with the lever C. These links $h\ h$ and collar $i$ virtually form a swinging frame, within which the tool D is free to rotate. Said tool D is forced up to its work by bearing inward or downward upon the lever C, the collar $i$ carrying the tool D along with it. The swinging frame $h\ h$ and $i$ provides for the self-adjustment of the cutting-tool D to its work or in line with the pipe free from restraint by the curvilinear motion of the lever C. The tool D is rotated while thus being fed or forced up to its work, in order to make it remove the burr or burrs left on the cut end of the pipe, caused by severing the latter, and to finish the cut end of the pipe, as required. A convenient means for rotating said tool D is provided for in the outer stem-extension or shank, *s*, upon which a handle, E, may be secured by a locking or set screw, *v*; but my invention is not restricted to any precise means for rotating said tool. After the cut end of the tube or pipe A has had the burr or burrs on it removed, and said end of the pipe has been finished as required by the apparatus, inward thrust is relieved from the lever C, when the machine or apparatus may readily be shifted or drawn off the tube or pipe.

Having thus fully described my invention, I claim as new and desire to secure by Letters Patent—

1. The tool D, having a head, *k*, provided with an annular recess, *m*, in its inner face, cutters *g* around the outer margin of said annular recess, and a reaming-cutter or cutting projection, *f*, arranged to project centrally from within said recess, substantially as and for the purpose specified.

2. The tool D, having a head, *k*, provided with an annular recess, *m*, in its inner face, cutters *g* around the outer margin of said annular recess, a reaming-cutter or cutting projection, *f*, arranged to project centrally from within said recess, and an outer stem-extension or shank, *s*, essentially as and for the purpose herein described.

3. In a combined hand-tool and holder for removing the burrs from or finishing the cut ends of tubes or pipes, the combination of an arm or jaw adapted to slip over the pipe and to hold onto the same, a pressure-lever attached to said arm or jaw, a swinging frame carried by said lever, and a rotatable finishing cutting-tool having its bearings in said swinging frame and provided with means for rotating it, substantially as specified.

4. In a combined tool and holder for finishing the cut ends of tubes or pipes, the combination of the eye or sleeve-like arm B, having a clamping projection, *c*, the pressure-lever C, the links *h h*, and collar *i*, and the rotatable cutting-tool D, provided with means for rotating it and having inner and outer cutters, *f g*, essentially as described.

5. In a combined tool and holder for finishing the cut ends of tubes or pipes, the combination, with the clamping arm B, lever C, and swinging frame *i h h*, of the rotatable cutting-tool D, having means for rotating it, and provided with an annular recess, *m*, and inner and outer cutters or cutting projections, *f g*, adapted to operate upon the inside and outside of the cut end portion of the pipe, substantially as described.

6. In a combined tool and holder for finishing the cut ends of tubes or pipes, the combination of the rotatable crank or handle E with the pressure-lever C, the clamping jaw or arm B, a swinging frame carried by said lever, and a finishing cutting-tool arranged for rotation within or through said swinging frame by the crank or handle E, essentially as herein set forth.

EMILIO QUEROL Y DELGADO.

Witnesses:
C. SEDGWICK,
A. E. BEACH.